United States Patent

[11] 3,527,189

| [72] | Inventor | Mark J. Perry<br>Box 187 Star Rte., Fort. George,<br>Florida 32037 |
|---|---|---|
| [21] | Appl. No. | 682,899 |
| [22] | Filed | Nov. 14, 1967 |
| [45] | Patented | Sept. 8, 1970 |

[54] LOW PRESSURE TIRE INDICATING MECHANISM
9 Claims, 24 Drawing Figs.

| [52] | U.S. Cl. | 116/34 |
|---|---|---|
| [51] | Int. Cl. | B60c 23/04 |
| [50] | Field of Search | 116/34, 70; 1/132; 73/146.2; 340/58 |

[56] References Cited
UNITED STATES PATENTS

| 1,660,523 | 2/1928 | Pearson | 240/8.2X |
|---|---|---|---|
| 2,008,622 | 7/1935 | McClure | 116/34X |
| 2,150,956 | 3/1939 | Woodberry | 116/34 |
| 2,543,226 | 2/1951 | Briggs | 240/8.1 |
| 2,790,155 | 4/1957 | De Lucia et al | 340/58 |
| 2,798,450 | 7/1957 | Higgins | 116/34 |
| 2,882,363 | 4/1959 | Cordell | 340/58X |
| 3,129,690 | 4/1964 | Nygard | 116/34 |
| 3,208,425 | 9/1965 | Jousma et al | 116/34 |
| 3,260,233 | 7/1966 | Bergunder | 116/34 |
| 3,333,242 | 7/1967 | Wooden | 116/34X |

Primary Examiner—Louis R. Prince
Assistant Examiner—Daniel M. Yasich
Attorneys—George H. Baldwin and Arthur G. Yeager ABSTRACT: A low pressure tire indicating mechanism for a vehicle pneumatic tire assembly including pressure responsive device attached thereto for rotation therewith and a flag movable between an inoperative position within the tire rim cavity and an operative position extending beyond the tire sidewall and into the view of the vehicle driver while operating the vehicle. A hose is connected between the pressure responsive device and the tire valve tube whereby the pressure therein is at the same pressure as the tire. The pressure responsive device includes a retractable plunger for releasably engaging the flag and a spring is provided to force the flag into its operative position when released by the plunger. The pressure responsive device includes a spring for biasing the plunger against a diaphragm and an adjustable means for altering the point at which the plunger releases the flag. A light is provided adjacent the tire assembly for illuminating the flag when in its operative position.

Patented Sept. 8, 1970

INVENTOR.
Mark J. Perry
BY
George H. Baldwin
ATTORNEY

Patented Sept. 8, 1970

INVENTOR.
Mark J. Perry
BY
George H. Baldwin
ATTORNEY

INVENTOR.
Mark J. Perry
BY
George H. Baldwin
ATTORNEY

Patented Sept. 8, 1970 3,527,189

INVENTOR.
Mark J. Perry
BY
George H. Baldwin
ATTORNEY

LOW PRESSURE TIRE INDICATING MECHANISM

BACKGROUND OF THE INVENTION

1. Field of Invention

This invention relates to low pressure tire indicating mechanisms and more particularly to an indicating mechanism for attachment to vehicles having pneumatic tires, such as tractors and trailers having dual tire assemblies.

2. Description of Prior Art

There have been numerous tire alarms for use in connection with pneumatic tires which employ a releasable member engaging the fender or the like to indicate a low pressure or flat tire condition. Among such patents are U.S. Pat. Nos. 1,038,801, 1,451,291 and 3,181,119. Other tire alarms use other audio alarms, such as whistles, see U.S. Pat. Nos. 1,467,317 and 2,609,784; and electrical bell systems, see U.S. Pat. No. 2,056,064. Some tire alarms have electrical light systems, such as U.S. Pat. Nos. 2,731,936 and 3,181,118; and others include a visual indicator on the tire assembly, such as U.S. Pat. Nos. 2,992,653 and 3,260,233.

It has also been known to employ warning devices in the fluid braking systems and in the engine lubricating systems, as for example, U.S. Pat. No. 2,477,725 in which the indicators are mounted in the driver compartment.

SUMMARY

This invention relates to a low pressure tire indicating mechanism for a vehicle pneumatic tire assembly, the mechanism including in one of its aspects a pressure responsive means having a housing attached to the tire assembly and rotatable therewith. A conduit means connects between the housing and the pneumatic tire through its valve tube so that the pressure in the tire and housing is substantially equal. Within the housing is a means having an inoperative position when the pressure is below a predetermined pressure and an operative position thereabove. A flag member is movably mounted with respect to the housing and such flag member has an inoperative position generally within the tire rim cavity and an operative position beyond the tire sidewall and into view of the driver. The means within the housing have an operative position to maintain the flag member in its inoperative position, and an inoperative position to release the flag member. Means are also provided for forcibly moving the flag member into its operative position when released by the means within the housing.

A general object of this invention is to provide an improved low pressure tire indicating mechanism, and particularly a mechanism mounted to the tire assembly of dual pneumatic tires.

A particular object is the provision of a low pressure mechanism including a flag movable from out of and into the vision of the driver of the vehicle upon low tire pressure, and particularly wherein the mechanism and flag are mounted to the wheel assembly for ready determination of the pressure condition of the tires either upon individual cursory inspection thereof outside of the driver compartment and/or from within the driver compartment.

Other specific objects are to provide improved low pressure mechanism that are durable in construction, service and use; simple and inexpensive in manufacture and in the installation upon vehicles; and positive, efficient and reliable in operation and use.

An additional specific object is the provision of improved low pressure tire indicating mechanism which give the vehicle driver an early warning of low pressure in one or more pneumatic tires while the vehicle is being driven in day or night operation.

A further specific object is to provide an improved low pressure indicating mechanism which includes a visible flag operable upon low pressure and non-returnable to its inoperable condition until the tire pressure is increased above a predetermined pressure at which the mechanism is set, thereby providing a continual monitoring of the air pressure of the vehicle tire.

BRIEF DESCRIPTION OF DRAWINGS

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

DESCRIPTION OF THE PREFERRED EMBODIMENTS

Figure 1:
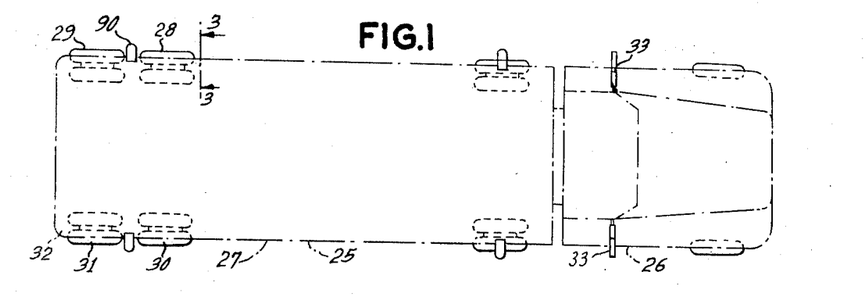
FIG. 1 is a plan view of a tractor and trailer vehcile having a plurality of low pressure tire indicating mechanisms mounted thereon in accord with the present invention, the tractor and trailer being shown in broken lines.
Figures 2, 3:
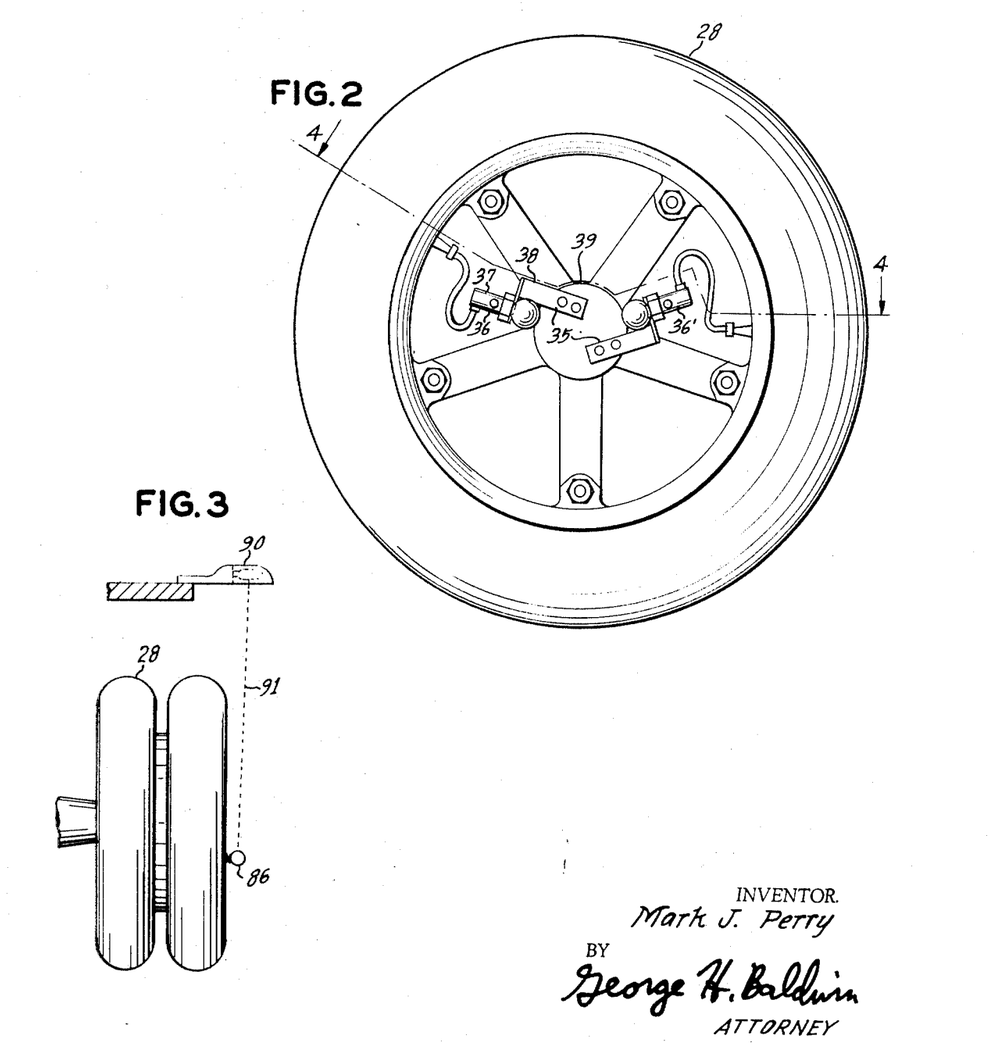
FIG. 2 is an enlarged side elevational view of one set of dual pneumatic tires of the vehicle depicted in FIG. 1 and showing one embodiment of the low pressure tire indicating mechanism being mounted thereto.
FIG. 3 is an enlarged transverse sectional view taken along line 3–3 of FIG. 1.
Figures 4, 5, 6:
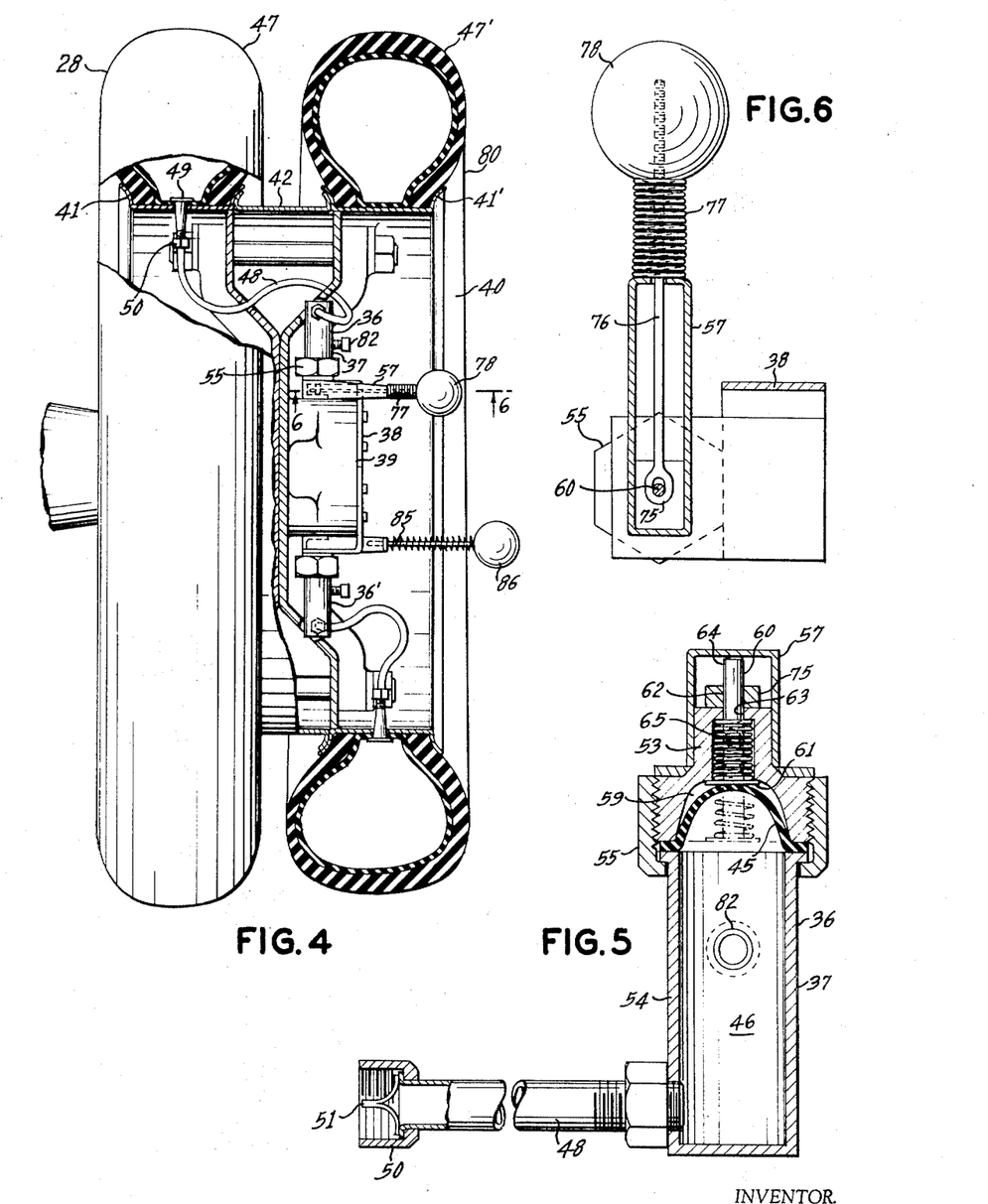
FIG. 4 is an enlarged transverse sectional view taken along line 4–4 of FIG. 2.
FIG. 5 is an enlarged transverse sectional view of the pressure responsive means of the mechanism depicted in FIGS. 2 and 4.
FIG. 6 is an enlarged transverse sectional view taken along line 6–6 of FIG. 4.

Referring now more particularly to the drawing of FIG. 1 the vehicle is depicted generally at 25 which includes the tractor 26 and trailer 27 with the trailer having four sets of dual pneumatic tire assemblies 28, 29, 30, 31 adjacent the rear trailer end portion 32. One such dual tire assembly 28 is shown in FIGS. 2, 3 and 4 with the low pressure tire indicating mechanism designated at 35, being mounted on tire assembly 28 for rotation therewith, as hereinafter more fully described. The dual tire assembly 28 comprises a pair of tires 47, 47' respectively mounted on rims 41 and 41' which are mounted for rotation about the axle (not shown), and a spacer rim 42 is nested between rims 41 and 41' to maintain proper spacing between tires 47 and 47'.

The first embodiment of tire indicating mechanism 35 in accord with the present invention is best understood by reference to FIGS. 2—6 and comprises a pressure responsive means 36 which includes a housing 37 attached by bracket 38 to the hub 39 of the tire assembly 28 generally within the tire rim cavity, designated at 40 in FIG. 4. Internally of the housing 37 is a pressure responsive member or diaphragm 45 with a chamber 46 on one side of diaphragm 45 which communicates with the pneumatic tire 47 via conduit means 48 and the tire valve tube 49. Conduit means 48 includes a releasable connection 50 for threadably connecting the conduit means 48 to the valve tube 49, and a valve depressor 51 is located within connector 50 for depressing the common valve (not shown) in valve tube 49 when the connector 50 is attached to the valve tube 49 whereby the pressure in the tire 47 is substantially the same as the pressure within the conduit means 48 and the pressure within chamber 46.

Housing 37 includes two releasable portions 53 and 54 connected by threaded member 55 with the diaphragm 45 being interposed therebetween. A flag member housing 57 extends laterally of and is connected, as by welding, to portion 53 of housing 37.

A plunger 60 having an enlarged base 61 adjacent the diaphragm 45 is disposed in chamber 59 which is on the opposite side of diaphragm 45 and is operatively associated with the diaphragm 45 for movement thereof in response to movement of diaphragm 45. The upper plunger end portion 62 is slidably mounted through a passageway 63 in the upper end portion 53 of the housing 37. A spring 65 engages housing end portion 53 and abuts plunger base 61 to bias plunger 60 toward the diaphragm 45. As shown in FIG. 5, the diaphragm 45 bulges outwardly of the chamber 46 due to a predetermined air pressure in tire 47 and in chamber 46 which causes the plunger 60 to extend outwardly of passageway 63 for connection to the flag member eyelet portion 75, as more clearly shown in FIG. 6. When the air pressure in tire 47 decreases below another predetermined pressure below the force of spring 65, spring 65 enlarges and forces plunger 60 against diaphragm 45 causing diaphragm 45 and plunger 60 to retract toward chamber 46. When plunger 60 is retracted so that its upper end 64 is generally within passageway 63 and the diaphragm 45 assumes its dotted line position shown in FIG. 5, the lower flag member eyelet portion 75 is released whereby flag member 76 is moved outwardly by compression spring 77 to position its most outward indicating end portion 78 into its operative extended position beyond the tire sidewall, generally depicted at 80, and into the view of the vehicle driver through rear view mirror 33 while the driver is operating the vehicle.

As shown in FIGS. 4 and 6, the flag member 76 and end portion 78 are in their inoperative position within the tire rim cavity 40 whereas the other flag member 85 is in its operative position with its indicating end portion 86 being positioned outwardly of the tire sidewall 80. It is to be understood that the pressure responsive means 36', which includes flag member 85, is identical in construction with pressure responsive means 36 hereinabove described.

A valve member 82 is mounted to the housing 37 for communication with chamber 46 whereby air may be pumped through valve member 82 into chamber 46 through conduit means 48 and through tire valve 49 and into tire 47 for filling tire 47 with air or increasing the pressure therein without removal of connection 50 from the tire valve 49.

Light means 90, shown in FIGS. 1 and 3, is associated with vehicle 25 adjacent the tire assembly 28 for directing a beam of light, depicted by a broken line 91 in FIG. 3, towards indicating end portion 86 of flag member 85. It is to be understood that end portion 86 should preferably be of a highly reflective metal or other material capable of high reflectivity so that the vehicle driver readily may see the end portion 86 through rear view mirror 33 during the night, when end portion 86 is in the operative position shown in FIGS. 3 and 4.

The second embodiment of the low pressure tire indicating mechanism is generally shown at 100 in FIGS. 7 and 8, wherein substantially equivalent components are designated with the same characters as hereinabove described in connection with the first embodiment of the mechanism in FIGS. 1-—6. Mechanism 100 includes a base 101 connected to hub 102 for supporting pressure responsive means 36 and 36' on the dual tire assembly 28 for rotation therewith. Flag means 105 includes an elongated member 106 having a normal inoperative position generally parallel with the tire sidewall 80 and spaced inwardly of tire rim cavity 40, member 106 having opposite end portions 107 and 109 which highly reflective members 109 and 110 are attached. Members 109 and 110 are also positioned generally within the tire rim cavity 40, as shown by full lines in FIG. 7, by a support member 112 threadably connected to hub 102 which extends outwardly therefrom generally in alignment with the axle of the dual tire assembly 28. Arm 106 is attached to support member 112 by a pivotal connection 114 approximately equidistant between arm end portions 107 and 108. Tension springs 116 and 118 are respectively connected between arm 106 and pressure responsive means 36 and 36' for maintaining arm 106 within the tire rim cavity 40 when the air pressure within the tires is above predetermined pressures.

Figures 7, 8, 9, 10:
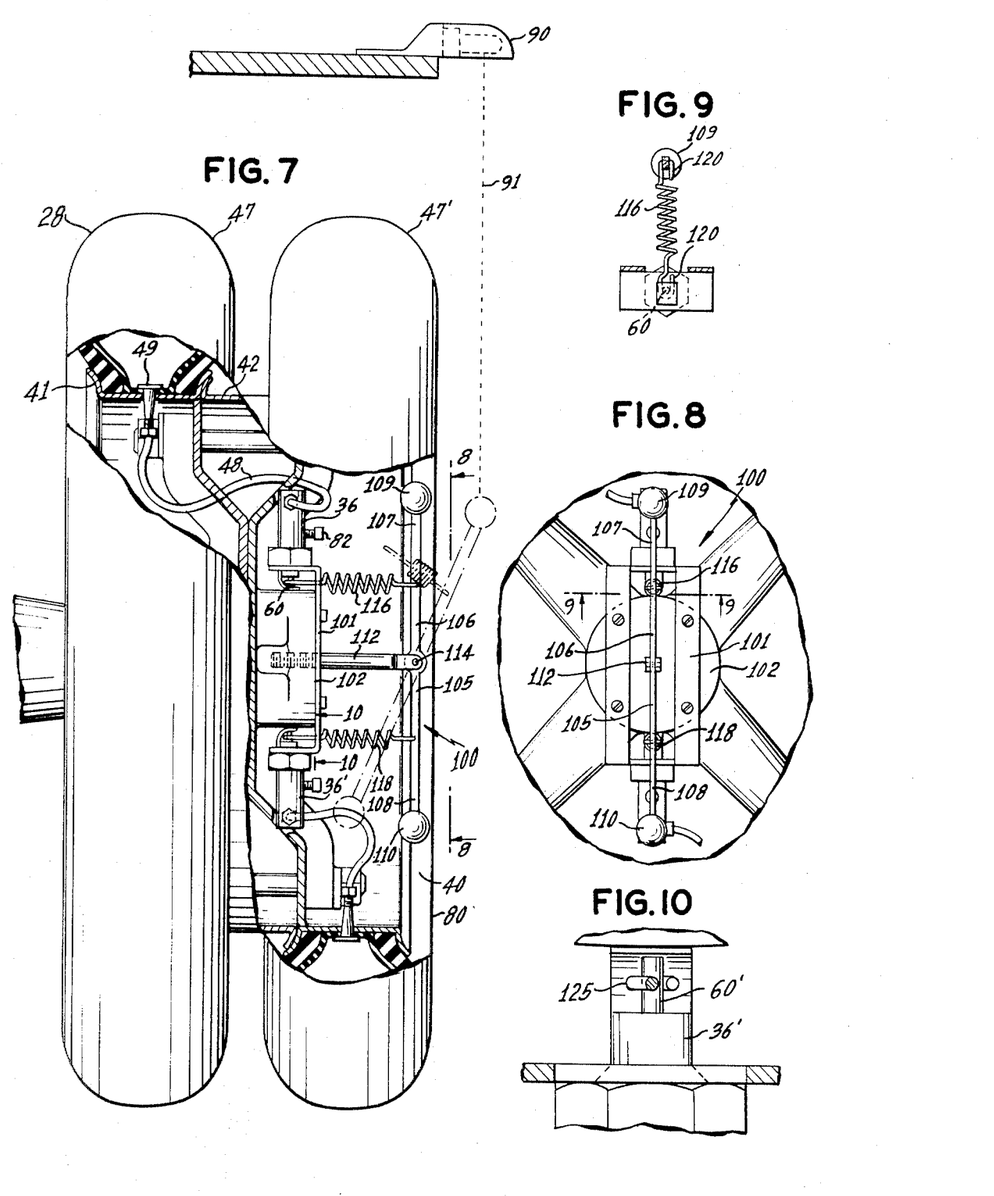
FIG. 7 is a view similar to FIG. 4 depicting the second embodiment of the low pressure tire indicating mechanism of the invention.
FIG. 8 is an elevational view taken along line 8–8 of FIG. 7.
FIG. 9 is a transverse sectional view taken along line 9–9 of FIG. 8.
FIG. 10 is an enlarged transverse sectional view taken along line 10–10 of FIG. 7.

The hook end 120 of spring 116 is releasably connected to the pressure responsive means 36 by plunger 60, as shown in FIG. 9, with the opposite hook end 122 of spring 116 being connected to arm 106 between the pivotal connection 114 and end portion 107. When the pressure within the tire 47 decreases below a predetermined set minimum, the diaphragm 45 within pressure responsive means 36 retracts toward chamber 46 whereupon spring 65 forcibly retracts plunger 60 to release the hook end 120 of spring 116 which causes spring 118 to forcibly pivot arm 106 into the broken line position shown in FIG. 7 to cause the indicating portion 109 to extend outwardly of the tire side wall 80 for viewing thereof by the vehicle driver through the rear view mirror 33.

The manner that the plunger 60' of pressure responsive means 36' engages the U-shaped or hook end portion 125 of spring 118 is shown more clearly in FIG. 10, it being understood that plunger 60 engages end portion 120 of spring 116 in exactly the same manner.

The third embodiment of the low pressure tire indicating mechanism in accord with the invention is depicted in FIGS. 11—15 and is designated generally at 130 and comprises a pair of pressure responsive means 36 and 36' which are identical to those previously described in connection with FIG. 6. Pressure responsive means 36 is connected by L-shaped bracket 131 to outstanding post member 132 suitably welded to metal hub cap 102 and generally in alignment with the axle (not shown) of the dual tire assembly 28. The flag means 135 is supported in its inoperative position within the tire rim cavity 40, as depicted in full lines in FIG. 11, with flag means 135' being shown in its operative indicating position with a portion 143' extending outwardly of the tire sidewall 80 to dispose reflective end 144' in view of the driver. The numerals 36', 135', 143' and 144' are intended to correspond to the respective numerals 36, 135, 143 and 144, and the components referred to are substantially identical.

Figure 11:
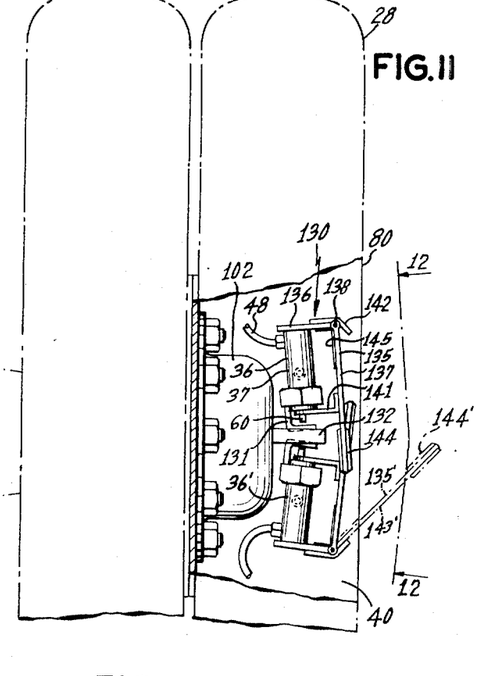
FIG. 11 is a view similar to FIGS. 4 and 7 depicting the third embodiment of the low pressure tire indicating mechanism of the invention.
Figure 12:
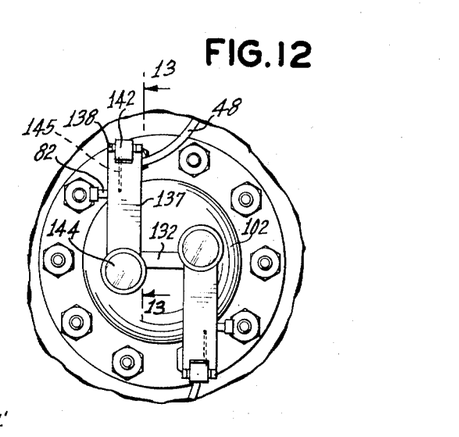
FIG. 12 is an elevational view taken along line 12–12 of FIG. 11.
Figures 13, 14:
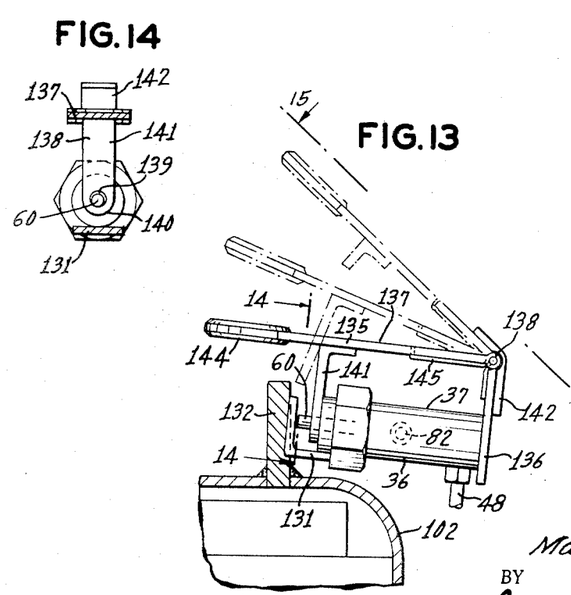
FIG. 13 is an enlarged transverse sectional view taken along line 13–13 of FIG. 12.
FIG. 14 is a transverse sectional view taken along line 14–14 of FIG. 13.
Figure 15:
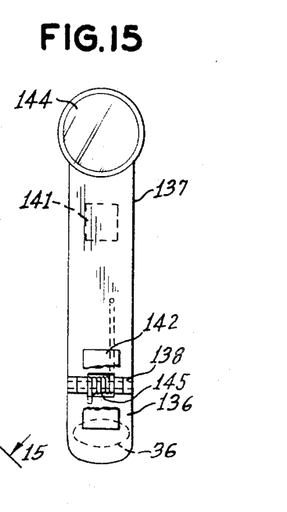
FIG. 15 is an elevational view taken along line 15–15 of FIG. 13.

Flag means 135 comprises a pair of arms 136 and 137 with a hinge connection 138 therebetween. Arm 136 is suitably connected as by welding to housing 37 and another arm 141 is connected to arm 137 and extends generally parallel with arm 136, arm 141 being spaced from the pivotal connection 138 and cooperating with plunger 60 to releasably maintain arm 137 in its inoperative position within the tire rim cavity 40. As seen clearly in FIG. 14 member 141 has an opening 139 adjacent end 140 through which plunger 60 extends when the pressure in the tire is above a predetermined set pressure as hereinabove described in connection with the other embodiments of the invention. An L-shaped stop member 142 is connected to member 136 and arm 137 contacts stop member 142 to position the outer highly reflective end 144 in its operative position outwardly of the tire sidewall 80 when plunger 60 is retracted from within opening 139 of arm 141. Arm 137 is spring loaded by spring means 145 which moves arm 137 to its operative position when the arm is released for movement by the pressure responsive means 36. As seen in FIG. 11 it is preferable to have the outer highly reflective end 144' approximately in alignment with the axle which improves the visual indication thereof sensed by the driver. In other words, a stronger image is perceived from the reflective member 144, because the path of travel of member 144 as compared with member 109 of FIG. 7 is reduced. It is to be understood that while the other embodiments previously described do not show the outer end portions of the flag means as being in general alignment with axle axis, it will be apparent that several of the previous embodiments could be modified to permit the indicating end portions of the flag means to be in general alignment with the axle axis when the flag means is extended beyond the tire sidewall 80.

Figures 16, 17, 18, 19:
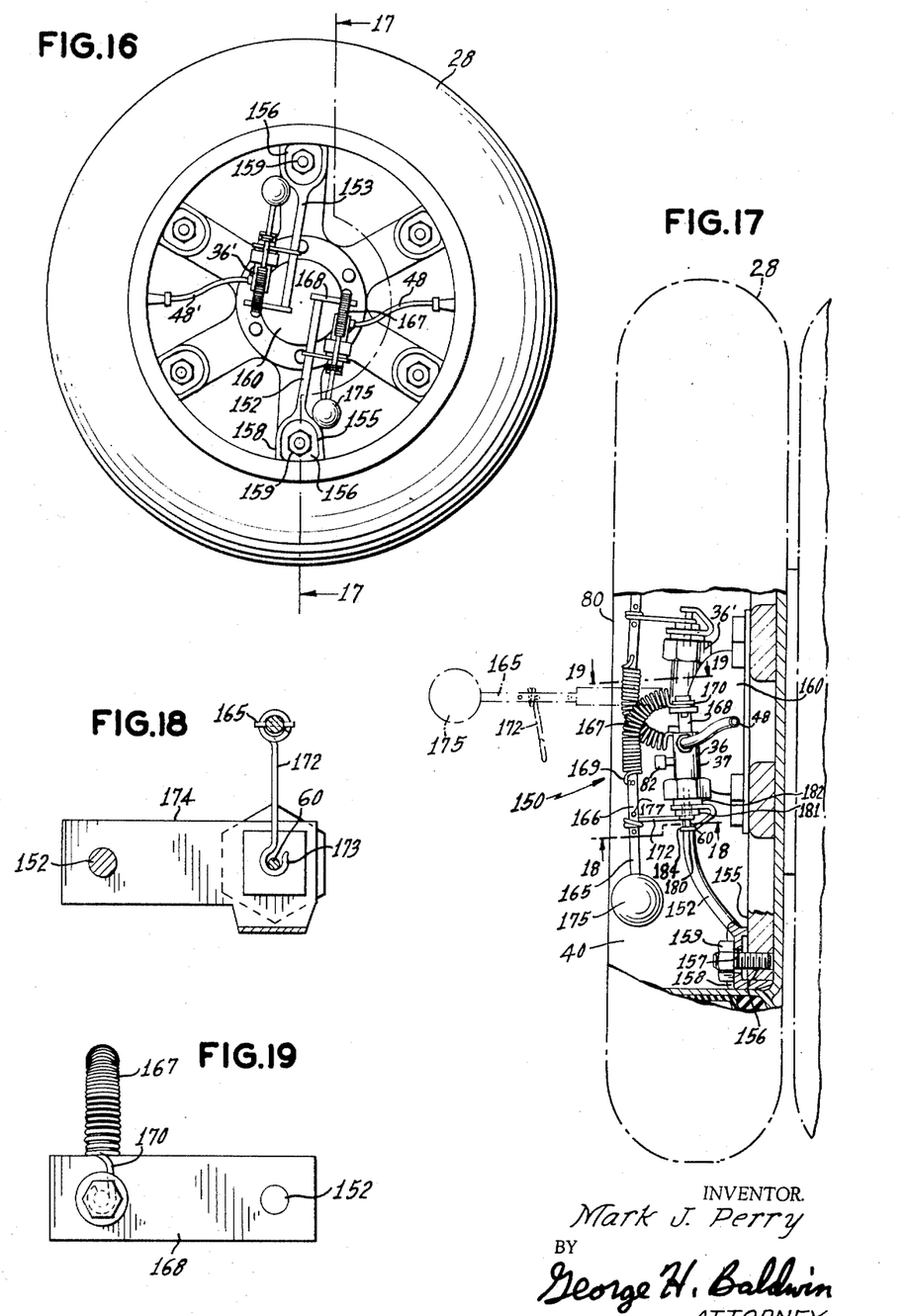
FIG. 16 is a view similar to FIGS. 2 and 8 showing the fourth embodiment of the low pressure tire indicating mechanism of the invention.
FIG. 17 is an enlarged transverse sectional view taken along lines 17–17 of FIG. 16.
FIG. 18 is an enlarged transverse sectional view taken along line 18–18 of FIG. 17.
FIG. 19 is an enlarged transverse sectional view taken along line 19–19 of FIG. 17.

The fourth embodiment of the invention is shown in FIGS. 16—19 and is generally designated at 150, mechanism 150 comprising a pair of pressure responsive means 36 and 36' respectively connected by supporting arms 152 and 153 which are in turn attached to the wheel rim assembly 155 by lugs 156 passing through opening 157 in the adjacent arm portion 158 with nuts 159 threadedly engaging lugs 156 for releasably connecting arms 152 and 153 in the position shown in FIGS. 16 and 17. Arms 152 and 153 extend upwardly and outwardly from their connection with tire rim assembly 155 to dispose pressure responsive means 36 and 36' adjacent the hub 160.

The flag means 165 is shown in position within the tire rim cavity 40 and comprises an elongated member 166 and an elongated heavy spring 167 attached at one end 169 to arm 166 and the other end 170 attached by bracket 168 to housing 37'. A latch member 172 is connected to arm 166, latch member 172 having a hook portion 173 remote from its attachment with arm 166 for engagement with plunger 60 of pressure responsive means 36 when the pressure in the tire is above a predetermined set pressure as hereinabove described in connection with the other embodiments of the invention. When the pressure drops below the predetermined pressure, plunger 60 is retracted thereby releasing latch 172 whereupon spring 167 forces flag 165 to its extended position, shown by broken lines in FIG. 17, with its indicating end portion 175 disposed in easy view of the driver.

Unlike the L-shaped bracket 131 which constitutes a fixed or stationary stop for plunger 60, an adjustable stop means in the form of a U-shaped member 180 is releasably connected by nut 181 onto housing nipple end portion 182, member 180 having an opening therethrough fitted around the nipple end of portion 182. It is to be clear that the plunger 60 is slidable with respect to the housing end portion 182 in the same manner as shown in FIG. 5 with respect to passageway 63, and the plunger 60 is preferably out of contact with member 180 and nut 181. To effectively alter the predetermined pressure at which the flag means 165 will be released by plunger 60, member 181 may be removed and spacer washers of determined thicknesses may be interposed between end portion 182 and member 181 to decrease and/or increase the distance between the end of plunger 60 and the stop 184.

In this connection, it is to be understood that other means of adjusting the spring 65, and/or the stop means 180 and/or the distance between the flag member 240 and the plunger 234, as hereinafter more fully described in connection with FIGS. 22 and 23, can be provided, and that some of the embodiments disclosing fixed stops for the plunger may be modified to incorporate the hereindescribed adjustments and the advantages thereof.

FIG. 18 shows the detail of bracket 174 for attaching housing 37 to arm 152 as well as the manner of connection between plunger 60 and latch 172 through hook portion 173. FIG. 19 discloses the details of bracket 168 for connecting spring 167 in proper position with respect to pressure responsive means 36 and arm 152. Employment of a spring 167 as a portion of arm 165 provides the advantages of not only extending the indicating end portion 175 into its operative position, but functions as a yieldable means therefor when the end portion 175 happens to strike an object or the like. It is to be understood that several of the embodiments of this invention could be modified to include a spring, such as spring 167 and/or an equivalent yieldable means without departing from the spirit of the invention.

A plurality of openings 177 are spaced along member 166 so that the lateral extent of the position of indicating end 175 may be adjusted by selecting the proper one of the openings 177 and attaching the spring end 169 therein. This provision similarly could be incorporated into several of the embodiments of the invention.

The fifth embodiment of the invention is shown in FIGS. 20—23 and is generally designated at 200 which comprises a base member 201 mounted to plastic hub cap 207 which is threaded into hub 205, base member 201 being adjacent the hub cap front face 206 and having an opening 208 therethrough in alignment with threaded opening 209 in hub cap 207 through which threaded member 210 is releasably connected for positioning base member 201 on the hub cap 207 for rotation therewith. Base member 201 is shown as being a metal casting and at each end 211 and 212 the base member constitutes portions of respective pressure responsive means 215 and 215', as more clearly shown in FIG. 22 and 23, hereinafter more fully described.

Hub cap 207 includes a plurality of wedge-shaped channels or depressions 206' in front face 206 into which a spanner wrench fits for removal and tightening of the hub cap 207 on the hub 205. The base member 201 includes a wedge-shaped projection 213 between its ends 211 and 212 which generally complements and nests within one of the depressions 206' thereby more positively affixing the base member 201 to the hub cap 207 and preventing relative rotation therebetween.

If base member 201 were to be mounted on a metal hub cap, for example hub cap 102 in FIG. 7, screws may be employed through the plurality of openings 216 extending through base member 201. Before such connection, projection 213 is removed by merely bending and breaking thereof along a line of weakness 214, as shown in FIG. 21.

Pressure responsive means 215 comprises a housing 220 having a plunger housing portion 221, and base member portion 201 connected together by bolts 223, with diaphragm 222 clamped between portion 201 and 221. Portion 201 has a cavity or chamber 224 on one side of diaphragm 222 which conforms and functions as chamber 46 hereinabove described in connection with FIG. 5. A passageway 226 communicates at one end with chamber 224 and the other end communicates with passageway 228 extending laterally thereof for communication with conduit means 230, substantially identical with conduit means 48 hereinabove described in connection with FIG. 5. An air valve member 232, as seen in FIG. 20, is provided to permit the pneumatic tire to be filled with air, and this air valve 232 conforms with air valve member 82 described in connection with FIGS. 4 and 5. Plunger 234 is slidably positioned within bore 236 in housing portion 221 for engagement with flag member arm 240 in notch 242 when plunger 234 is in its extended position shown. When the air pressure in chamber 224 decreases below the force of the spring 250 the plunger 234 is retracted and the outer end portion 270 of plunger 234 disengages notch 242 to permit the spring 245 to move flag member arm 240 to its operative extended position with arm 240 being stopped by stop pin 246 which is positioned in an appropriate location adjacent the outer end 248 of housing portion 221. In the position shown indicating end portion 241 of arm 240 is in general alignment with the axle and is in position to be illuminated by the light source (not shown).

As to function, chamber 224 conforms to chamber 46, chamber 225 conforms to chamber 59, spring 250 conforms to spring 65, plunger 234 conforms to plunger 60, diaphragm 222 conforms to diaphragm 45, all as previously described in connection with the other embodiments of the invention.

Spring 245 is connected to housing 220 beneath two of the elongated bolts 223 spaced on either side of the housing 220. The upper end portion 255 of spring 245 is engaged within an elongaged slot 256 in arm 240. As shown in FIG. 20 when the arm 240 is in extended position, spring end portion 255 bottoms adjacent one end of the slot 256 and when in the retracted position, end portion 255 bottoms adjacent the opposite end of the elongated slot 256, as clearly shown by the location of end portion 255' in slot 256' of the retracted arm 240'.

Arm 240 is pivotally mounted in a slot 260 within the outer end portion 248 of housing portion 221 and is connected for pivotal movement by eccentric cam 262 which engages arm 240 through an opening 264 in the arm 240 adjacent the notch 242. By rotation of the cam 262, after disengagement of the set screw 265, the cam 262 may be rotated to position the arm 240 a predetermined maximum dimension from the plunger end 270 which engages within notch 242 as shown in FIG. 22. When the cam is rotated 180° the arm 240 will be positioned at its minimum distance away from the plunger end 270. This eccentric cam 262 provides the selective adjustable means of setting the pressure responsive means 215 so that it will operate at an appropriate predetermined set low pressure of the tire to indicate same by release of the flag member 240 into its operative extended position. It is to be understood that in the several embodiments of the invention the spring 65 and/or spring 250 are selected to have a predetermined force so that it is compressed, as shown in FIG. 5, when the pressure in the tire 47 is above a predetermined pressure. For example, the pressure indicating means may be set to release its flag member into its operative position when the pressure in the tire 47 decreases below 75 lbs./inch$^2$, while it could be set anywhere between about 50 to 120 lbs./inch$^2$ by selection of the appropriate springs 65 and 250 and/or adjustment of a selectively adjustable member, such as eccentric cam 262.

Figures 20, 21, 22, 23, 24:
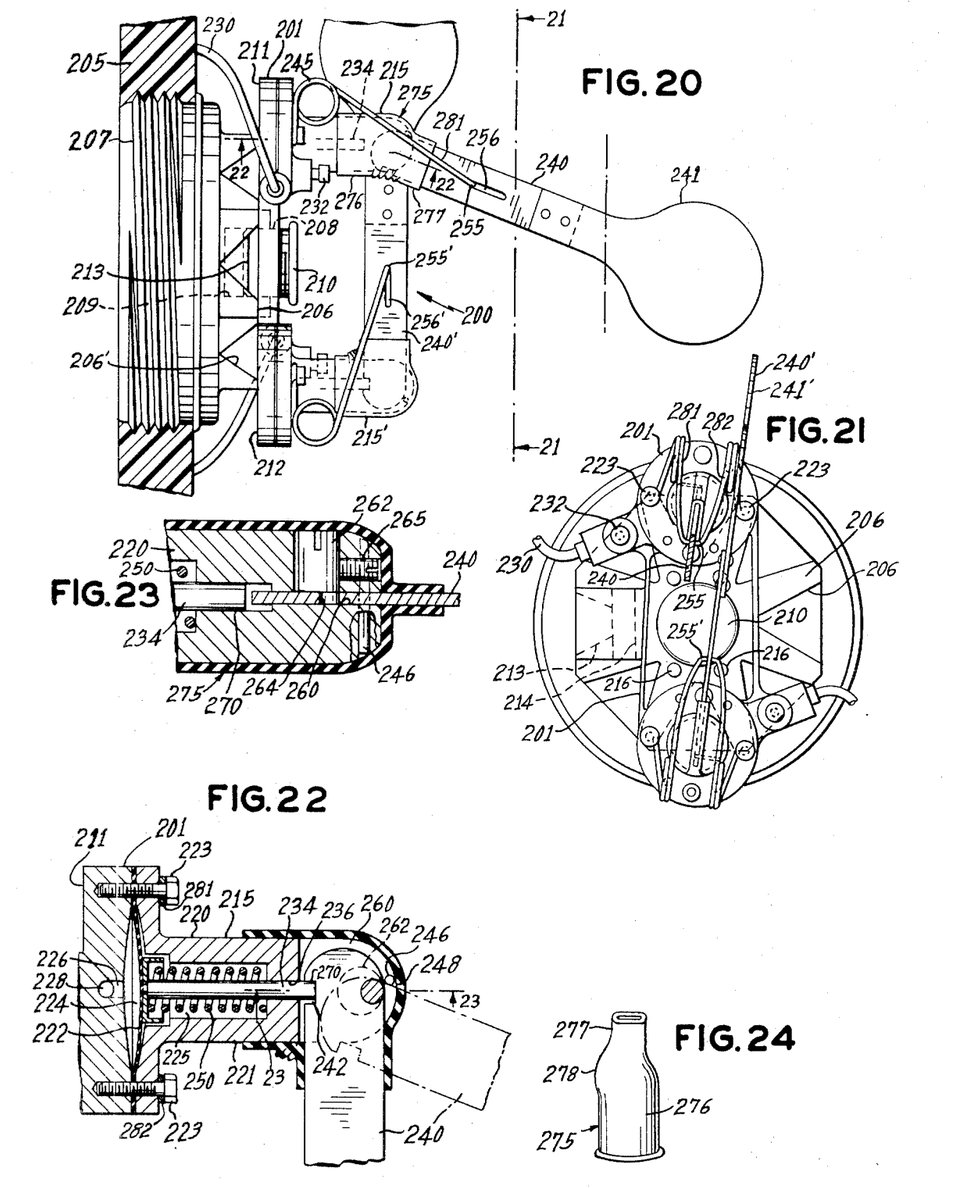
FIG. 20 is a view similar to FIGS. 4, 7, 11 and 17 depicting the fifth embodiment of the low pressure tire indicating mechanism of the invention.
FIG. 21 is a transverse sectional view taken along line 21–21 of FIG. 20.
FIG. 22 is an enlarged transverse sectional view taken along line 22–22 of FIG. 20.
FIG. 23 is an enlarged transverse sectional view taken along line 23–23 of FIG. 22.
FIG. 24 is a perspective view of one of the protective members surrounding the upper portion of the pressure responsive means.

The protective boot 275 is preferably preshaped as seen in FIG. 24 and is seen to include an enlarged generally cylindrical portion 276 which tightly fits around the cylindrical housing 220 and a reduced rectangular portion 277 which is snug around rectangular flag member 240 with the legs 281 and 282 of spring 245 spaced on either side of boot portion 275. Boot 275 includes an enlarged portion 278 which permits ready stretching thereof when the member 240 is in its operative position. Protective boot 275 functions to inhibit the ingress of water, mud, road tar, salt and other road materials from entering the slot 260 and/or plunger passageway 226 which might otherwise tend to prevent the proper functioning of the components of the pressure responsive mechanism.

While only certain preferred embodiments of this invention have been shown and described by way of illustration, many modifications will occur to those skilled in the art and it is, therefore, desired that it be understood that it is intended in the appended claims to cover all such modifications as fall within the true spirit and scope of this invention.

I claim:

1. In a low pressure tire indicating mechanism for a vehicle pneumatic tire assembly having a tire rim cavity comprising pressure responsive means including a housing attached to the tire assembly within the tire rim cavity for rotation therewith, a pressure responsive member movably mounted within said housing, said housing having a chamber therein defined by a portion of said housing and said member, conduit means connected at one end to said housing and communicating with said chamber, the other end of said conduit means being adapted to communicate with the pneumatic tire through its valve tube whereby the pressure in said chamber is substantially at the same pressure as the pneumatic tire, said housing having an opening through a portion thereof remote from said chamber portion, a plunger having opposite end portions with one end portion extending through said opening and having the other end portion operatively associated with said pressure responsive member for movement thereof in one direction in response to movement of said member, spring means having a force less than the predetermined pressure in said chamber operatively associated with said plunger for movement thereof in a direction opposite to the one direction when the pressure in said chamber decreases below the force of said spring means, a flag member movably connected with respect to the tire assembly within the tire rim cavity and releasably connected to said plunger, said flag member being maintained in its inoperative position generally within the tire rim cavity by said other end portion of said plunger when the pressure is above the force of said spring means, said flag member being released for movement by said spring means forcibly moving said plunger when the pressure in said chamber decreases below the force of said spring means, and means for moving said flag member away from said plunger upon its release by said plunger into its operative extended position exteriorly of the tire rim cavity and outwardly beyond the tire sidewall and into the view of the vehicle driver while operating the vehicle.

2. In the low pressure tire indicating mechanism as defined in claim 1 further comprising light means associated with the vehicle adjacent the tire assembly for illuminating said flag member when in its operative extended position.

3. In the low pressure tire indicating mechanism as defined in claim 1 further comprising means for swingably mounting said flag member for movement thereof between its operative and inoperative positions with respect to the tire assembly.

4. In a low pressure tire indicating mechanism for a dual vehicle pneumatic tire assembly wherein the tire assembly includes a pair of tires mounted on rims and connected for rotation on an axle of the vehicle, comprising a pair of pressure responsive means each including a housing attached to the tire assembly within the tire rim cavity of the outer tire for rotation therewith, a pressure responsive member movably mounted within each said housing, each said housing having a chamber therein defined by a portion of said housing and said member, a pair of conduit means with one connected at one end to one said housing and communicating with said chamber thereof, the other end of said one conduit means being adapted to communicate with one pneumatic tire through its valve tube whereby the pressure in said one chamber is substantially at the same pressure as the one pneumatic tire, the other said conduit means being connected at one end of the other said housing and communicating with said chamber thereof, the other end of said other conduit means being adapted to communicate with the other pneumatic tire through its valve tube whereby the pressure in said other chamber is substantially at the same pressure as the other pneumatic tire, each said housing having an opening through a portion thereof remote from its said chamber portion, a plunger having opposite end portions with one end portion extending through respective said housing openings and having the other end portion operatively associated with respective said pressure responsive member for movement thereof in one direction in response to movement of respective said member, spring means having a force less than the predetermined pressure in each said chamber operatively associated with respective said plunger for movement thereof in a direction opposite to the one direction when the pressure in said chamber decreases below the force of respective said spring means, a flag means maintained in its inoperative position generally within the outer tire rim cavity by said other end portion of respective said plunger when the pressure is above the force of respective said spring means and released for movement when the pressure in respective said chamber decreases below the force of respective said spring means, means for moving said flag means into its operative extended position beyond the outer tire sidewall and into the view of the vehicle driver while operating the vehicle, said flag means including a rod connected to the tire assembly and having an outer end disposed generally in alignment with the axle and inwardly within the outer tire rim cavity, an arm having opposite end portions pivotally connected adjacent its midportion to said outer rod end, said spring means including a pair of elongated springs having end portions connected to and between said arm on either side of said rod and the opposite spring ends releasably engaged by respective said other end portions of said plungers whereby when one said plunger releases one said spring end portion the other said spring forcibly pivots said arm to dispose one said arm end portion beyond the outer tire sidewall.

5. In a low pressure tire indicating mechanism for a vehicle pneumatic tire assembly having a tire rim cavity comprising pressure responsive means including a housing attached to the tire assembly within the tire rim cavity for rotation therewith, a flag member movably connected with respect to said housing and to the tire assembly and having its inoperative position generally within the tire rim cavity and its operative position extending exteriorly of the tire rim cavity and outwardly beyond the tire sidewall and into the view of the vehicle driver while operating the vehicle, conduit means connected at one end to said housing and the other end being adapted to communicate with the pneumatic tire through its valve tube whereby the pressure in said housing is substantially at the same pressure as the pneumatic tire, means in said housing having an inoperative position when the pressure in said conduit means and pneumatic tire is below a predetermined pressure and an operative position when the pressure is above said predetermined pressure, said means in said housing in its operative position being releasably connected to said flag member for maintaining said flag member in its inoperative position and said means in its inoperative position releasing said flag member to move away from said means and into its operative position, and force means for moving said flag member into its operative extended position away from said means in said housing after said means in said housing releases said flag member, said means in said housing including a pressure responsive member movably mounted in said housing, a plunger having opposite end portions with one end portion being operatively associated with said member and the other end portion being releasably connected to said flag member, said plunger maintaining said flag member in its inoperative position when the pressure in said conduit means and pneumatic tire is above said predetermined pressure, said plunger releasing said flag member to move away from said plunger and into its operative position when the pressure in said conduit means and pneumatic tire is below said predetermined pressure.

6. In the low pressure tire indicating mechanism as defined in claim 5 further comprising an adjustable stop means for said plunger to vary the distance between said other end portion and said stop means thereby effectively altering said predetermined pressure at which said flag member will be released to assume its operative position.

7. In the low pressure tire indicating mechanism as defined in claim 5 wherein said flag member includes an outer end portion when the flag member is in its said operative position in the driver's view while operating the vehicle, said housing being attached to said tire assembly to dispose same closely adjacent the hub cap thereof, said outer end portion of said flag member when in the driver's view being in general alignment with the longitudinal axis of the axle covered by the hub cap.

8. In the low pressure tire indicating mechanism as defined in claim 5 wherein said flag member includes an outer end portion viewable by the driver while operating the vehicle when said flag member is in its operative position, and means attached to the vehicle for illuminating the outer flag end portion.

9. In the low pressure tire indicating mechanism as defined in claim 5 further comprising means for pivotally mounting said flag member for movement thereof between its operative and inoperative positions with respect to the tire assembly.